US006354318B2

(12) United States Patent
Butler

(10) Patent No.: US 6,354,318 B2
(45) Date of Patent: Mar. 12, 2002

(54) SYSTEM AND METHOD FOR HANDLING MULTIPHASE FLOW

(75) Inventor: Bryan V. Butler, Houston, TX (US)

(73) Assignee: Rosewood Equipment Company, Plano, TX (US)

( * ) Notice: Subject to any disclaimer, the term of this patent is extended or adjusted under 35 U.S.C. 154(b) by 0 days.

(21) Appl. No.: 09/748,078

(22) Filed: Dec. 22, 2000

Related U.S. Application Data

(63) Continuation of application No. 09/186,007, filed on Nov. 4, 1998, now Pat. No. 6,164,308.

(60) Provisional application No. 60/098,238, filed on Aug. 28, 1998.

(51) Int. Cl.$^7$ .................................................. G05D 7/00

(52) U.S. Cl. ................. 137/2; 137/565.29; 137/565.33; 137/561 A; 137/599.01

(58) Field of Search ........................ 137/561 A, 565.33, 137/173, 2, 565.29, 599.01

(56) References Cited

U.S. PATENT DOCUMENTS

| | | | | |
|---|---|---|---|---|
| 1,834,065 | A | 12/1931 | Ler | 137/173 |
| 4,055,480 | A | 10/1977 | Smith et al. | 208/11 |
| 4,087,261 | A | 5/1978 | Hays | 55/41 |
| 4,144,754 | A | 3/1979 | Pitts, Jr. et al. | 73/205 D |
| 4,200,789 | A | 4/1980 | Arnold et al. | 250/270 |
| 4,210,015 | A | 7/1980 | Euzen et al. | 73/61.1 R |
| 4,215,567 | A | 8/1980 | Vlcek | 73/61.1 R |
| 4,282,760 | A | 8/1981 | Pitts, Jr. et al. | 73/861.02 |
| 4,292,011 | A | 9/1981 | Erickson | 417/53 |
| 4,294,695 | A | 10/1981 | Smith et al. | 210/173 |
| 4,396,508 | A | 8/1983 | Broughton | 210/187 |
| 4,403,911 | A | 9/1983 | Possell | 415/90 |
| 4,429,581 | A | 2/1984 | Furmaga | 73/861.04 |
| 4,431,534 | A | 2/1984 | Gordon | 210/110 |
| 4,441,361 | A | 4/1984 | Carlson et al. | 73/155 |
| 4,441,362 | A | 4/1984 | Carlson | 73/155 |
| 4,528,919 | A | 7/1985 | Harbolt et al. | 111/7 |
| 4,604,902 | A | 8/1986 | Sabin et al. | 73/861.04 |
| 4,641,679 | A | 2/1987 | Arnaedeau et al. | 137/110 |
| 4,646,273 | A | 2/1987 | Carlson et al. | 367/32 |
| 4,660,414 | A | 4/1987 | Hatton et al. | 73/61.1 R |
| 4,705,114 | A | 11/1987 | Schroeder et al. | 166/357 |
| 4,730,634 | A | 3/1988 | Russell | 137/173 |
| 4,760,742 | A | 8/1988 | Hatton | 73/861.04 |
| 4,776,210 | A | 10/1988 | Baillie et al. | 73/61.1 R |
| 4,793,418 | A | 12/1988 | Wheeler et al. | 166/357 |
| 4,800,921 | A | 1/1989 | Greebe | 137/561 |
| 4,802,361 | A | 2/1989 | Bussian et al. | 73/61.1 R |
| 4,813,270 | A | 3/1989 | Baillie | 73/61 R |
| 4,822,484 | A | 4/1989 | Prendergast et al. | 210/96.1 |
| 4,824,614 | A | 4/1989 | Jones | 261/76 |
| 4,852,395 | A | 8/1989 | Kolpak | 73/61.1 R |
| 4,881,412 | A | 11/1989 | Northedge | 73/861.04 |
| 4,884,457 | A | 12/1989 | Hatton | 73/861.04 |
| 4,924,695 | A | 5/1990 | Kolpak | 73/61.1 R |

(List continued on next page.)

OTHER PUBLICATIONS

Brochure, "Accuflow™ Multiphase Metering System".

*Primary Examiner*—A. Michael Chambers
(74) *Attorney, Agent, or Firm*—Standley & Gilcrest LLP

(57) ABSTRACT

A method and device for transferring a multiphase flow to a predetermined location through a pipe. The multiphase flow is comprised of at least a liquid phase and a gas phase. The multiphase flow is provided to a flow divider that diverts a gas portion from the multiphase flow. A compressor and a pump are in fluid communication with the flow divider. The main gas portion is boosted by the compressor, and the residual liquid/gas portion is boosted by the pump. A recombination manifold then recombines the gas portion and the residual liquid portion. A single pipe receives the recombined multiphase flow and transfers it to a predetermined location.

20 Claims, 10 Drawing Sheets

U.S. PATENT DOCUMENTS 4,974,446 A 12/1990 Vigneaux .................... 73/155
4,974,452 A 12/1990 Hunt et al. .............. 73/861.64
4,979,880 A 12/1990 Delaittre .................... 417/406
5,020,359 A 6/1991 Castel ........................ 73/61 R
5,025,160 A 6/1991 Watt ......................... 250/356.1
5,033,288 A 7/1991 Castel ...................... 73/61.1 R
5,036,710 A 8/1991 King ....................... 73/861.04
5,047,632 A 9/1991 Hunt .......................... 250/302
5,049,823 A 9/1991 Castel et al. ................ 324/640
5,083,452 A 1/1992 Hope ......................... 73/61 R
5,095,983 A 3/1992 Magnani ..................... 166/250
5,127,272 A 7/1992 Dean et al. .............. 73/861.04
5,149,344 A 9/1992 Macy .......................... 55/167
5,150,061 A 9/1992 Castel et al. ................ 324/640
5,156,537 A 10/1992 Massinon ................... 417/536
5,173,195 A 12/1992 Wright et al. ............... 210/802
5,195,380 A 3/1993 Hatton et al. ............ 73/861.04
5,203,211 A 4/1993 Jung ....................... 73/861.04
5,209,765 A 5/1993 Kolpak et al. ................ 55/168
5,214,284 A 5/1993 Tokunaga et al. ........... 250/309
5,218,840 A 6/1993 Kolpak ...................... 73/61.44
5,224,372 A 7/1993 Kolpak ...................... 73/19.03
5,226,482 A 7/1993 Giannesini et al. ......... 166/353
5,235,684 A 8/1993 Becker et al. .............. 395/325
5,251,488 A 10/1993 Haberman et al. ....... 73/861.04
5,254,292 A 10/1993 Gabryelczyk et al. ........ 261/76
5,259,239 A 11/1993 Gaisford .................... 73/61.44
5,287,782 A 2/1994 Scott ........................... 83/447
5,290,151 A 3/1994 Orlando ....................... 417/54
5,306,911 A 4/1994 Hunt .......................... 250/302
5,353,627 A 10/1994 Diatschenko et al. ...... 73/19.03
5,353,646 A 10/1994 Kolpak .................... 73/861.04
5,375,618 A 12/1994 Giannesini .................. 137/110
5,375,976 A 12/1994 Arnaudeau ............... 415/199.5
5,377,714 A 1/1995 Giannesini et al. ............ 137/2
5,390,547 A 2/1995 Liu ......................... 73/861.04
5,393,202 A 2/1995 Levallois ..................... 417/19
5,400,657 A 3/1995 Kolpak et al. ........... 73/861.04
5,415,024 A 5/1995 Proffitt et al. .............. 73/61.44
5,431,228 A 7/1995 Weingarten et al. ........ 166/357
5,437,299 A 8/1995 Kolpak .......................... 137/1
5,447,370 A 9/1995 Cessou .................... 366/167.1
5,456,120 A 10/1995 Simonian ................. 73/861.04
5,461,930 A 10/1995 Farchi et al. ............ 73/861.04
5,483,171 A 1/1996 Hatton et al. ............... 324/640
5,485,743 A 1/1996 Taherian et al. ........... 73/61.44
5,526,684 A 6/1996 Liu et al. ...................... 73/200
5,531,112 A 7/1996 Young et al. ................. 73/152
5,561,245 A 10/1996 Georgi et al. ............ 73/152.02
5,575,615 A 11/1996 Mohn .......................... 415/74
5,575,625 A 11/1996 Castel ........................ 417/178
5,580,214 A 12/1996 Mohn .......................... 415/64
5,586,027 A 12/1996 Carlson et al. ............. 364/422
5,591,922 A 1/1997 Segeral et al. ........... 73/861.04
5,597,961 A 1/1997 Marrelli ................... 73/861.04
5,608,170 A 3/1997 Atkinson et al. ........ 73/861.04
5,631,413 A 5/1997 Young et al. ............ 73/152.29
5,635,631 A 6/1997 Yesudas et al. ............ 73/61.46
5,646,352 A 7/1997 Joseph et al. ................. 73/756
5,654,551 A 8/1997 Watt et al. ............... 250/356.1
5,660,532 A 8/1997 Castel ........................ 417/342
5,660,617 A 8/1997 Hatton ........................ 95/254
5,661,237 A 8/1997 Dussan .................... 73/152.18
5,661,248 A 8/1997 Bernicot et al. ......... 73/861.04
5,680,899 A 10/1997 Waid et al. ............ 166/250.01
5,698,791 A 12/1997 Lemaire .................. 73/861.04
5,706,211 A 1/1998 Beletic et al. .......... 364/514 R
5,707,427 A 1/1998 Stockman et al. ............ 95/260
5,710,717 A 1/1998 Hong et al. ................. 364/510
5,711,338 A 1/1998 Talon ............................ 137/8
5,736,637 A 4/1998 Evans et al. ............. 73/152.31
5,741,977 A 4/1998 Agar et al. ............. 73/861.04
5,747,674 A 5/1998 Moracchini et al. ....... 73/61.44
5,770,068 A 6/1998 Jepson ....................... 210/741
5,775,879 A 7/1998 Durando ...................... 417/45
5,777,278 A 7/1998 Bednarczyk et al. ........ 181/102
5,792,962 A 8/1998 Constant et al. ......... 73/861.04
5,793,216 A 8/1998 Constant ..................... 324/639
5,810,032 A 9/1998 Hong et al. ............. 137/561 A

SYSTEM AND METHOD FOR HANDLING MULTIPHASE FLOW

This application is a continuation of U.S. application Ser. No. 09/186,007 filed Nov. 4, 1998 now U.S. Pat. No. 6,164,308, which claims the benefit of U.S. Provisional Application No. 60/098,238, filed Aug. 28, 1998. Both of these prior applications are incorporated herein by reference.

BACKGROUND AND SUMMARY OF THE INVENTION

The present invention relates generally to a method and system for transferring a multiphase flow in a single pipe and, more particularly, to a method and system for parallel pressure boosting of the gas and liquid phases of a multiphase flow. A multiphase flow may include a gas phase, a liquid phase, and a solid phase. For example, pumping for oil may induce a multiphase flow which is comprised of oil, water, and natural gas. In fact, pumping for oil may induce a multiphase flow which is comprised of at least 95 percent natural gas and less than 5 percent oil.

It is important to industry to transfer a multiphase flow to a predetermined location through a single pipe in order to reduce costs. However, the gas phase and the liquid phase of a multiphase flow react differently to the application of pressure. As a result, several different systems have been developed for the transportation of multiphase flows.

One system divides the gas from the liquid and then separately raises the pressures of the gas and the liquid. The gas and the liquid are then transferred in different pipes. However, this system may require relatively high production costs.

French patent numbers 2,424,472 and 2,424,473 teach systems for transferring a two-phase fluid in a single pipe. The systems taught by these patents dissolve or emulsify the free gas in the liquid in order to obtain a more uniform fluid so that the fluid may be processed by the pumping means. However, these systems may require relatively high costs since the incoming flow mixture range may have to be limited, and additional controls are necessary.

Another system uses pumps designed for communicating to multiphase fluids a pressure value that provides for their transfer over a certain distance. However, these pumps are typically adapted for transferring multiphase flows that have a gas-to-liquid ratio within a limited interval. To remedy this limitation, devices are used for controlling the effluents located upstream from the pump in order to deliver a multiphase flow having a desired gas-to-liquid ratio to the pump. However, these devices do not work effectively when there is a sudden variation in the gas-to-liquid ratio.

Yet another system is taught by U.S. Pat. No. 5,377,714. This system utilizes a flow measurement device for separating the gas from the liquid in a multiphase flow.

In light of the shortcomings of known systems, a need exists for a more efficient system for handling a multiphase flow in a single pipe. The present invention provides pressure boosting of a multiphase flow stream. A preferred embodiment of the present invention is particularly useful when the multiphase flow is comprised of at least about 90 to 95 percent gas. However, it should be recognized by those of ordinary skill in the art that the present invention may be utilized when the multiphase flow has a lower percentage of gas.

It is preferred that a system of the present invention permits parallel pressure boosting of gas and multiphase flow by combining a compressor and a multiphase pump system. Because of the synergistic way this combination functions, there are many applications where the present invention may result in substantial reductions in power requirements and installation costs compared to systems using only multiphase pumps for boosting.

A standard pumping system may cover a range from 2,000 to 80,000 BPDe (the combined oil, gas, and water flow rate at inlet conditions). A combination system of the present invention may also cover this range. In fact, it may have a greatly expanded capacity (nearly quintupled).

A preferred embodiment of a system of the present invention divides the incoming flow and pre-conditions the gas flow going to the compressor. The remaining flow may consist of any variation of multiphase flow ranging from 100 percent gas to 100 percent liquids, and it may be managed by the pumping system. A preferred embodiment of a system of the present invention may include a flow strainer, a flow divider, connections to the compressor system, a multiphase pump, and a flow recombiner. It is preferably designed to work with several types of field compressors. A preferred embodiment of a system of the present invention may also include the basic controls, instrumentation, and piping needed for the system to work together.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
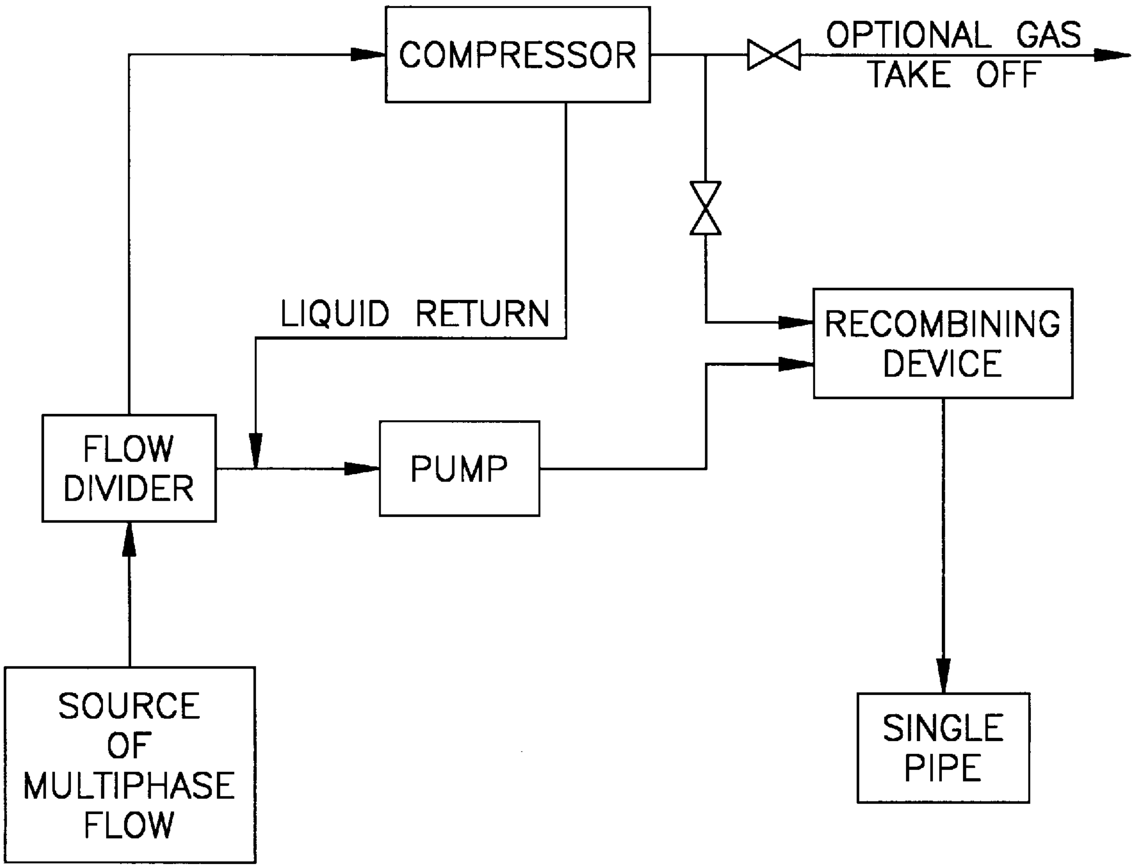
FIG. 1 is a block diagram of a preferred embodiment of a system of the present invention.
Figure 2:
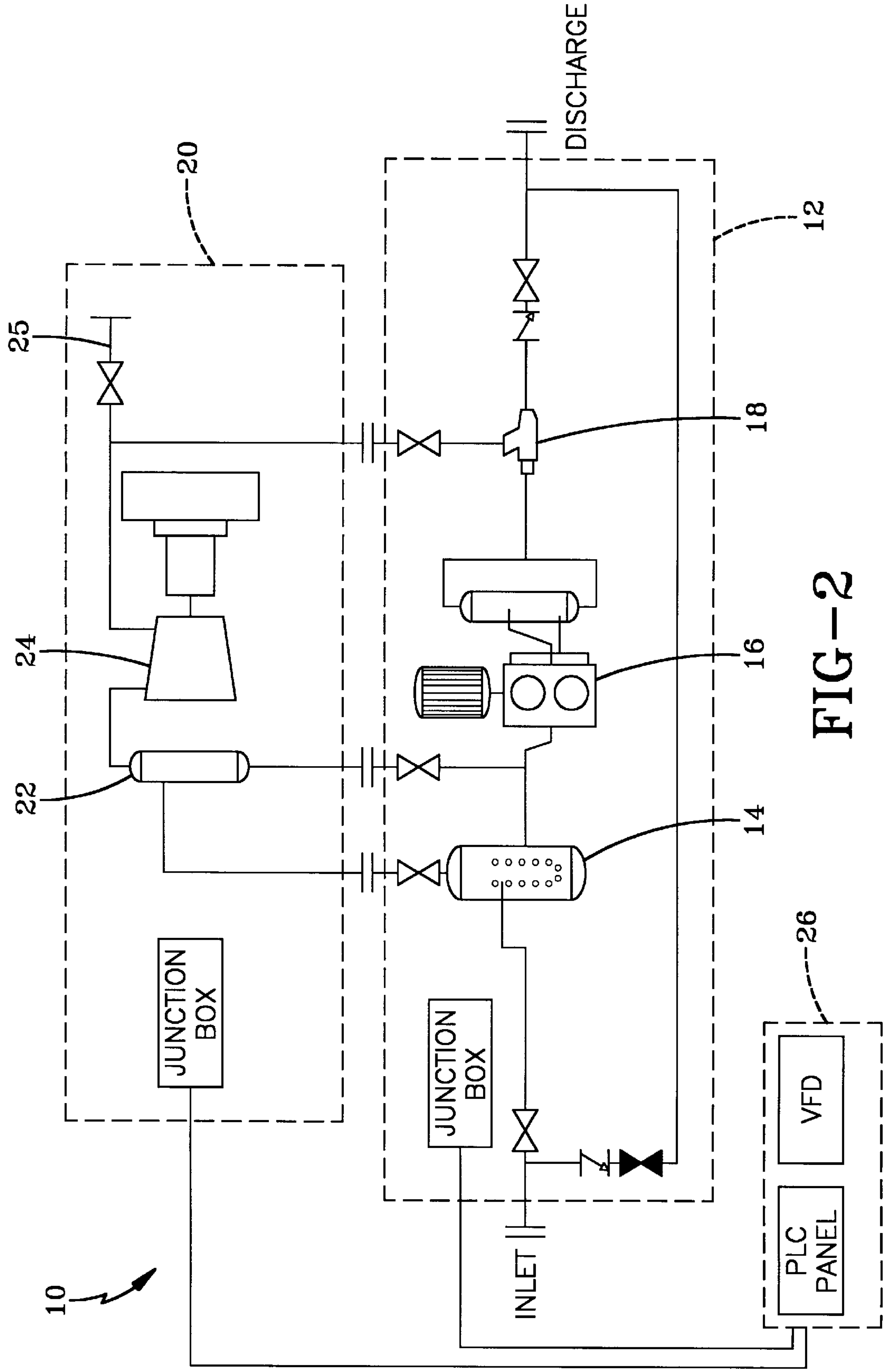
FIG. 2 is a schematic diagram of a second preferred embodiment of a system of the present invention.
Figure 3:
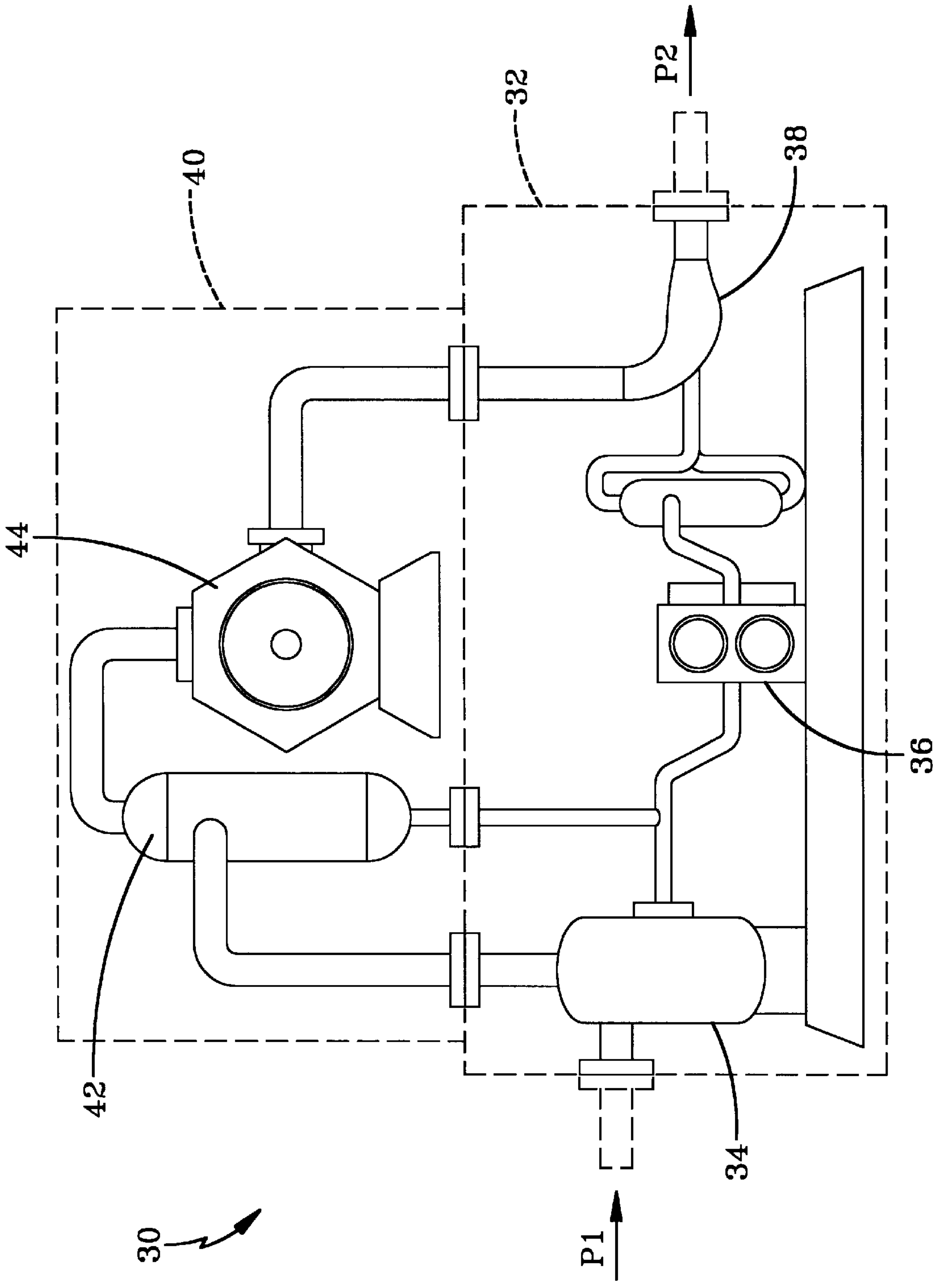
FIG. 3 is a schematic diagram of a third preferred embodiment of a system of the present invention.
Figure 4A:
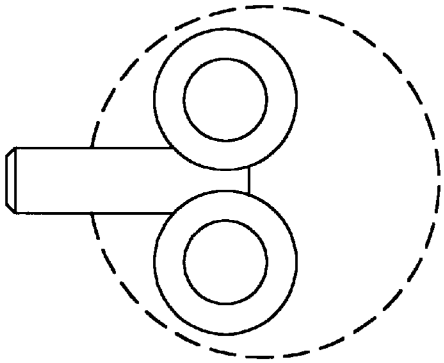
FIG. 4 is various details of a preferred embodiment of a flow divider of the present invention.
Figure 4B:
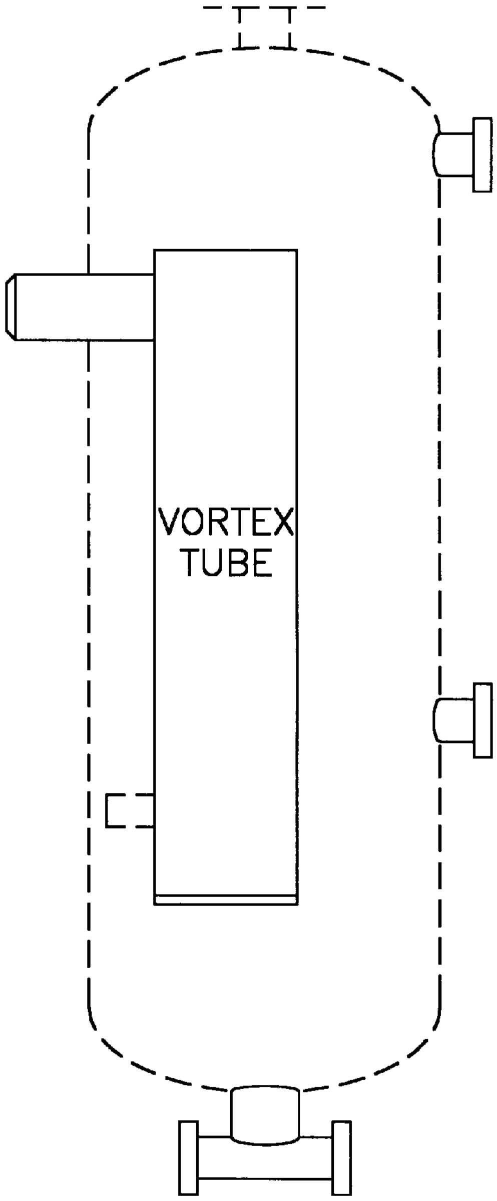
Figure 5A:
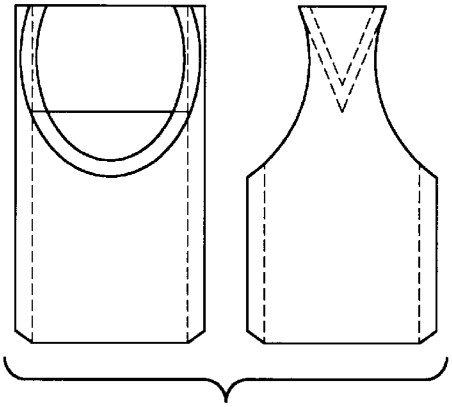
FIG. 5 is various details of a second preferred embodiment of a flow divider of the present invention.
Figure 5B:
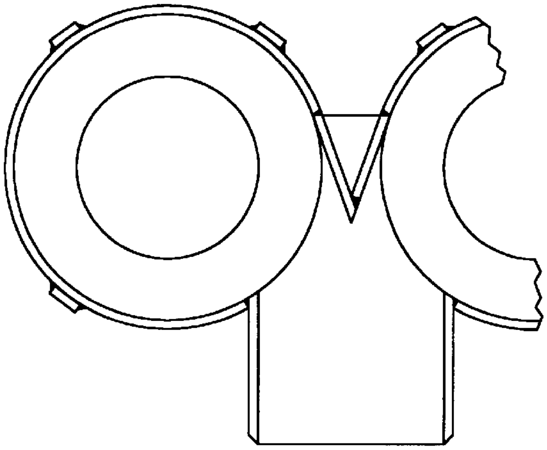
Figure 5C:
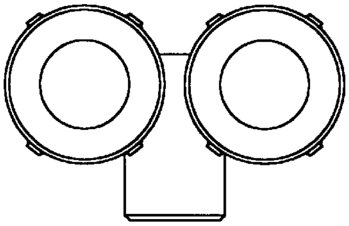
Figure 5E:
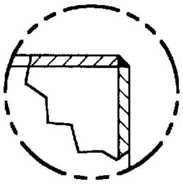
Figure 5F:
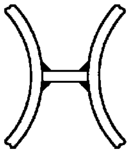
Figure 5D:
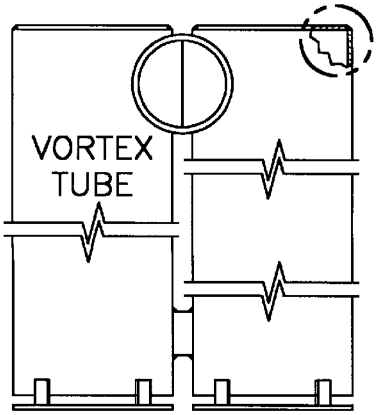
Figure 5G:
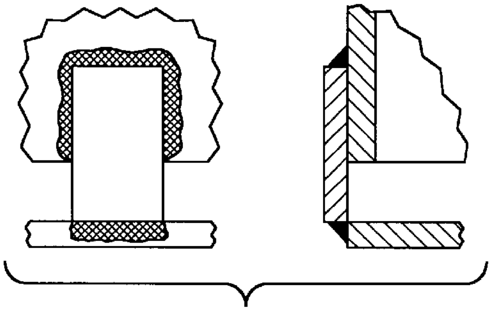
Figure 6:
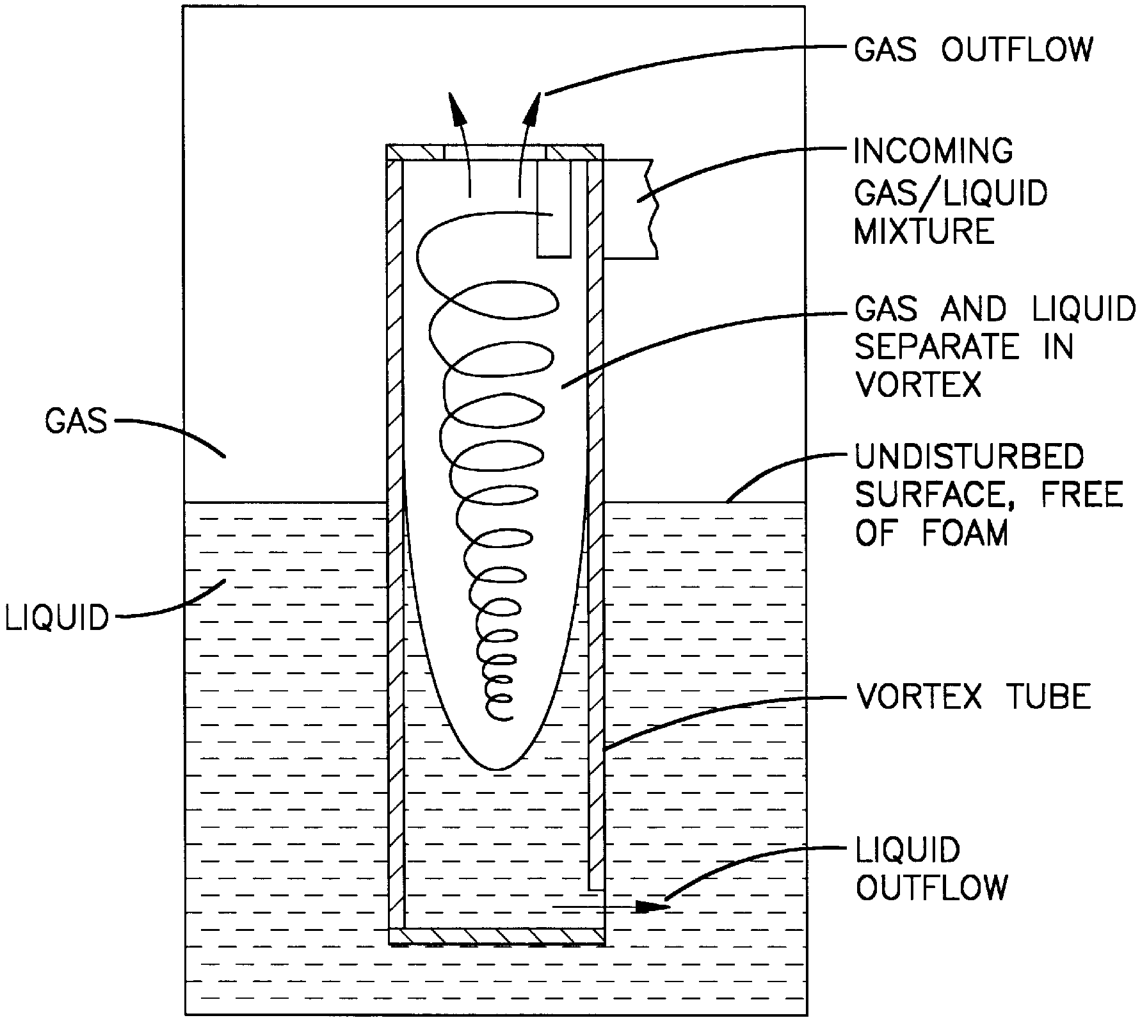
FIG. 6 is a cross sectional view of a third preferred embodiment of a flow divider of the present invention.

The present invention is directed to a method and system for parallel pressure boosting of the gas and liquid phases of a multiphase flow. FIG. 1 is a block diagram of a preferred embodiment of a system of the present invention. FIG. 2 is a schematic diagram of another preferred embodiment of a system of the present invention. In FIG. 2, the system 10 includes a pump module 12, a compressor module 20, and a control module 26. The pump module (a.k.a. dual booster module) 12 includes a flow divider 14, a multiphase pump system 16, and a recombining device 18, and the compressor module 20 includes a gas scrubber 22, a compressor 24, and an optional gas discharge take off 25. The multiphase pump system 16 preferably includes a liquid trap. FIG. 3 is schematic diagram of a third preferred embodiment of a system of the present invention. The system 30 includes a pump module 32 and a compressor module 40. The pump module 32 includes a flow divider 34, a multiphase pump system 36, and a recombining device 38, and the compressor module 40 includes a gas scrubber 42 and a compressor 44. Again, the multiphase pump system 36 preferably includes a liquid trap.

Those skilled in the art should recognize that the compressor module may include additional features. For example, a multistage compressor may include a liquid drop out tank as well as a gas scrubber vessel. A preferred embodiment of a system of the present invention may collect and drain the fluids from these vessels during the boosting operation.

The operation of a preferred system will now be described with general reference to FIGS. 1 through 3. The flow divider is preferably a straight pipe shell which may terminate in hemi-heads or flanged ends. Within the straight pipe shell are preferably at least two smaller tubes that may serve as the vortex tubes. A multiphase flow may enter the straight pipe shell and may then be directed and split into the upper ends of the smaller tubes. Flow may enter the smaller tubes tangentially, and the velocity head preferably converts the energy into centrifugal forces which force the liquids against the walls of the smaller tubes. Meanwhile, the gas preferably remains substantially in the centers of the tubes.

It is preferred that the bottoms of the smaller tubes are filled with liquid during operation of the system. As a result, the gas preferably exits through the tops of the smaller tubes. The liquid preferably continues to flatten against the walls of the smaller tubes and descends except for a small amount that may work its way up to a tube rim where droplets may be stripped off by the rising gas. Much of droplet load is preferably rained back down as the gas continues to rise. Small droplets, preferably about 5 microns, may remain in the gas as a mist and leave the flow divider. These small droplets preferably amount to less than about 0.5% by volume. Consequently, these small droplets preferably will not affect a rotary compressor.

The gas may be transferred to the compressor module. However, it should be recognized that some or all of the gas may be vented or otherwise diverted from the compressor module. A preferred embodiment of the system of the present invention includes a gas scrubber. The gas may continue to flow to the compressor module via the gas scrubber. It is preferred to continuously remove liquid from the gas as the gas flows to the compressor. Accordingly, the gas scrubber preferably removes liquid from the gas. In addition, the gas scrubber preferably serves to prevent liquid slugs from entering the compressor. The removed liquid may be returned to the inlet of the pump or to the flow divider. Some gas may also be returned with the removed liquid. The returned gas may be boosted by the pump.

At this point, the liquid has preferably been stripped of a high percentage of the gas. The degree of stripping depends on factors such as the viscosity and waxiness of the multiphase flow. In a preferred embodiment of the system, the liquid may flow out of the base of the tube through some perforations which may be created by a plate across the tube base.

The speed of the pump is preferably adjusted to maintain a desired liquid level range in the flow divider for maximum efficiency. A liquid level measurement device may monitor the liquid level in the flow divider. The liquid level measurement device may be a differential pressure indicator or practically any other suitable device. The liquid level measurement device preferably sends a signal to a programmable controller or any other suitable device. The programmable controller may then adjust the speed of the pump to substantially maintain the desired liquid level range in the flow divider. However, it should be recognized that the multiphase pump system may be run at a constant speed (i.e., no variable frequency drive) in some embodiments to minimize the liquid level and to allow gas to be pulled through the system during lulls between liquid slugs.

It is preferred to maintain the liquid level in the flow divider near a minimum level to maximize the available volume for liquid slugs. If the liquid level in the flow divider gets too high, there is a risk that a liquid slug may enter the compressor and swamp the system. This risk is preferably minimized by maintaining a low level, even though gas may also be drawn into the pump inlet line. The multiphase pump system preferably continues to operate normally through a wide variation of gas volumes.

The pump preferably automatically adjusts its discharge pressure to boost the flow that it receives to substantially match the outlet requirements that may be set by the line and by the compressor. A liquid trapping vessel is preferably positioned in the outlet to send liquid back through the seals and to maintain a sufficient rotor seal during gassy flows.

The fluids discharged from the pump may be recombined with the compressed gas flow in a recombination manifold or any other suitable device that is adapted to combine a liquid with a gas. The recombination manifold preferably includes a wye section and an eduction tube to facilitate the recombination of the fluids. The multiphase flow may then be transferred in a single pipe to a desired location.

Preferred embodiments of components of a preferred system will now be discussed.

Flow Divider

FIGS. 4 through 7 illustrate various views and details of preferred embodiments of a flow divider of the present invention. A flow divider is also commonly known as a gas diverter or a bulk gas separator. Flow dividers are available from many different companies. One example of a flow divider is a Vortex Cluster which is available from EGS Systems, Inc. of Houston, Tex.

Incoming flow (such as gas, oil, and/or water) is filtered (preferably by a coarse strainer) and divided into gas and "residual" multiphase flow in the flow divider. The gas, after preliminary demisting, may be sent to a gas compressor, where it may be connected to a liquid knockout tank provided on a compressor skid, and then to a compressor. Any residual liquids collected by the gas compressor knock out vessel may be brought back into the system.

Figure 7:
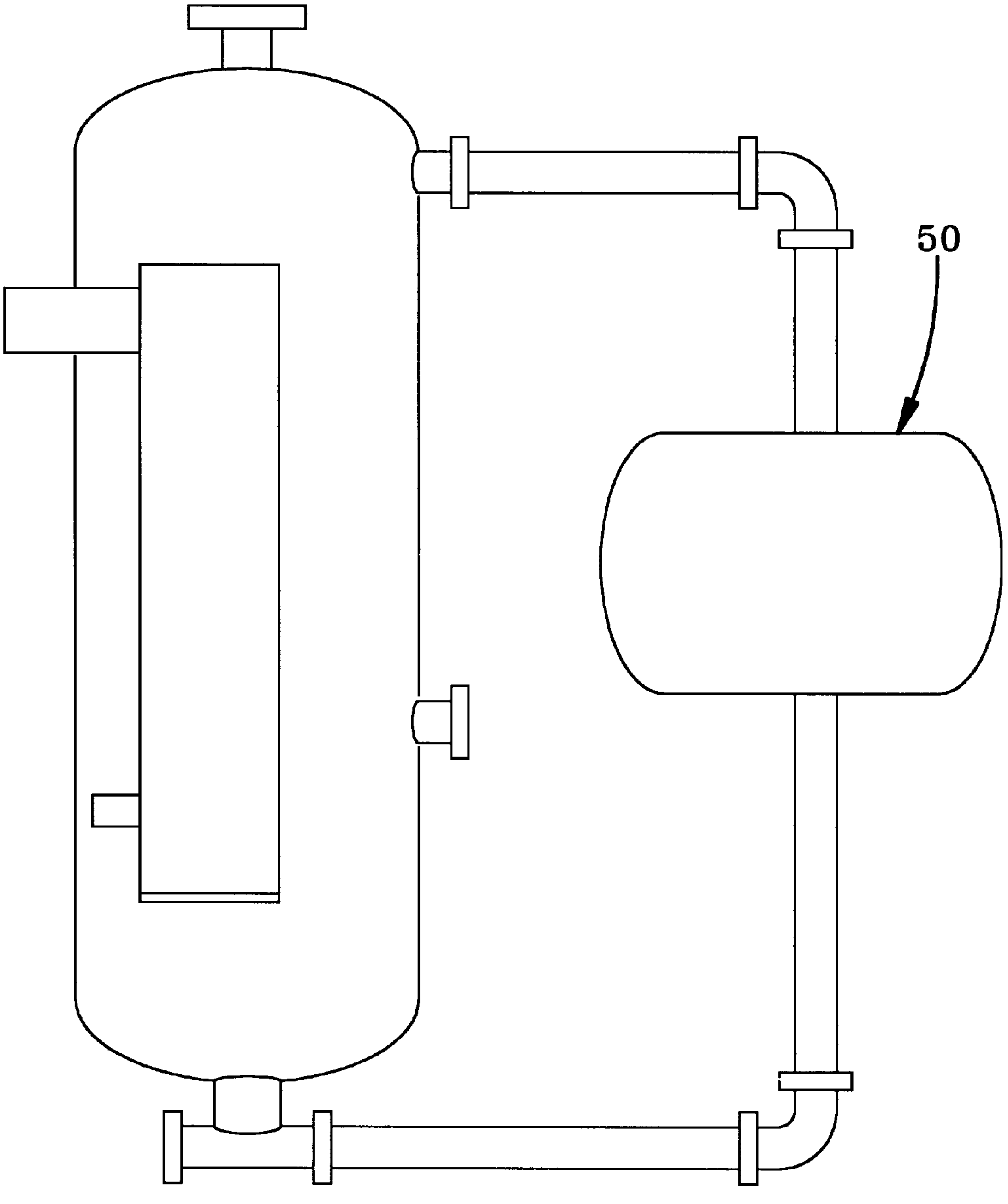
FIG. 7 is a cross sectional view of a fourth preferred embodiment of a flow divider of the present invention which has additional liquid slug volume capacity.

A variety of vessel and cluster configurations is possible. The flow divider preferably consists of a single or multiple vessels, each vessel preferably equipped with internal vortex cluster tubes with sufficient capacity to divide the incoming multiphase stream. In a preferred flow divider, each vortex tube may have top and bottom walls, at least one top opening for gas outflow, at least one lower, preferably bottom, opening for liquid outflow, and at least one side opening that admits the inlet stream tangentially. The vortex tube inlet openings are preferably connected to the vessel's inlet nozzle. The free gas separated through the cluster may exit the top of the flow divider and contain less than 1 percent liquid by volume with an average particle size less than 100 microns. The separated gas may be sent to a compressor or free flow to a pipeline or vent system. The flow divider may be equipped with a side outlet for gassy liquids to exit to the pump suction. In addition, a bottom connection is preferably provided for drainage and/or for expansion connections. FIG. 7 illustrates a preferred embodiment of a flow divider that includes an expansion volume 50 for additional liquid slug volume capacity. Those skilled in the art should recognize that extra liquid slug volume capacity may be added utilizing other conventional techniques.

The vortex tube proportions may be such as to allow very little liquid to leave the top openings with the gas. In operation, the vortex tubes may be partially immersed in liquid. The liquid preferably provides an effective seal that prevents gas from blowing out of the vortex tube lower openings. The liquid level in the vessel may be controlled in the same manner as it is in any conventional gas/liquid separator. Since there is preferably no splashing or bubbling in the vessel and incoming foam is preferably destroyed in the vortex tubes, the flow divider may be substantially free of foam. It should be recognized that, in preferred embodiments, the amount of foam in the flow divider may also be controlled by pulling the foam into the pump inlet.

Multiphase Pump

A system of the present invention may preferably utilize any size of multiphase pump that is adapted to cover flow rates from 2,000 to 80,000 equivalent barrels per day and differential pressures to 200 psi. Higher differential pressures are also available with a preferred system of the present invention using specially designed pumps. Examples of pumps which may be utilized in the present invention include Leistritz L4MK series multiphase pumps and Leistritz L4HK series multiphase pumps. The pump selection and its horsepower requirement are preferably based on the total average liquid rate anticipated, plus allowance for entrained gas, gas slugs, and liquid slugs.

Driver

A preferred embodiment of the system may utilize an electric motor, rated for Class I/Division 2 and suitable for inverter service, with variable frequency drive (VFD) controls. The motor is preferably selected to offer a wide margin of pump speeds and flow rates needed to manage the variable conditions anticipated for multiphase flow applications. Alternatively, a system may utilize natural gas or diesel engine drivers in situations where electric power may not be sufficient. The compressor units may also vary in the choice of driver, but the most common equipment may include a natural gas engine driver.

Mechanical Seals and Rotor Lubrication

John Crane or Burgmann Single Mechanical seals with throttle bushings are the preferred seals for the pumps. The seals, as well as the pump rotors, are preferably continuously lubricated to cool the seal faces and to maintain a liquid seal within the rotors. A system preferably uses an integral, external liquid trap downstream from the pump as the primary source for supplying this flushing liquid. Liquid levels may be continuously monitored so they are capable of supplying make up liquid during the temporary passage of a gas slug. This supply may be automatically regulated to flow through the filter and then may be distributed to each seal and rotor.

Recombination of Flows

The compressed gas from the compressor is preferably recombined with the multiphase flow in a recombination manifold before it leaves the system.

Instrumentation and Controls

The compressor may be gas engine driven and run at more or less a constant rate. The multiphase pump preferably handles the variable flow rates. A control system may be adapted to manage the flow rate variation of the multiphase unit using sensors located on the piping and flow divider of the system. This data may be sent to a PLC controller for the system along with pertinent data from the compressor unit.

In addition, the PLC controller may monitor operational status data provided by the compressor module and the dual booster module so that the total system is monitored and controlled as a single system. If an electric motor is used on the dual booster module, the PLC may provide the control data to the VFD for this motor. Both the VFD and PLC may be separately mounted for use in a non-classified area, and they may be connected by cables to the pumping system and the compressors at their respective junction boxes.

Protection and Isolation

A single suction side wye strainer with 20 mesh SS screen may be provided on the inlet line. The system may also equalize pressure across the pump during shut down to limit rotor backspin and to facilitate restart. The compressor and dual booster modules may be bypassed, or the compressor module may be bypassed, using the isolation block valves and eyeglass safety blinds which may be included with the piping system.

EXAMPLE

Figure 8:
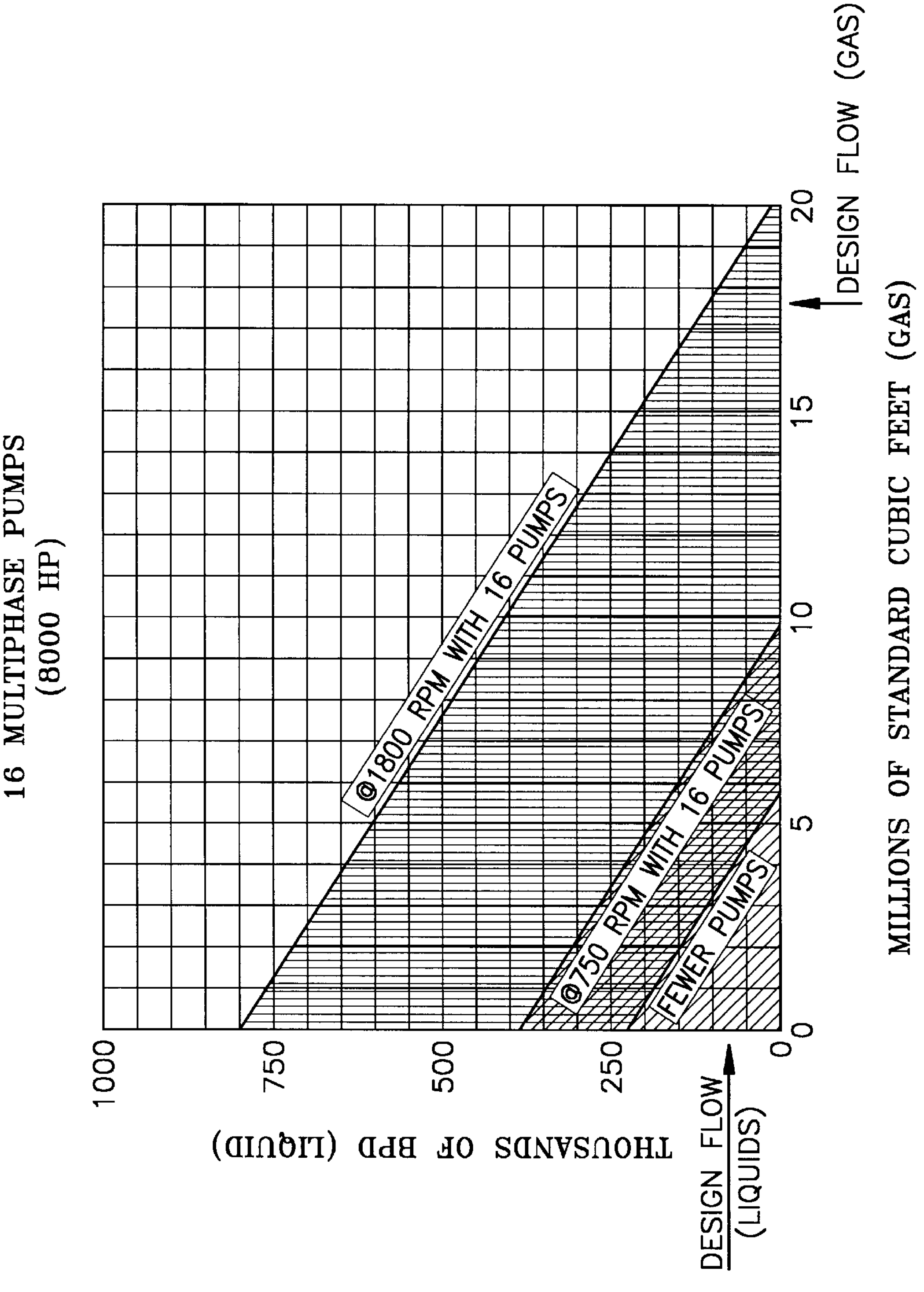
FIG. 8 is a graph of the performance of a known system during a test peak flow period.
Figure 9:
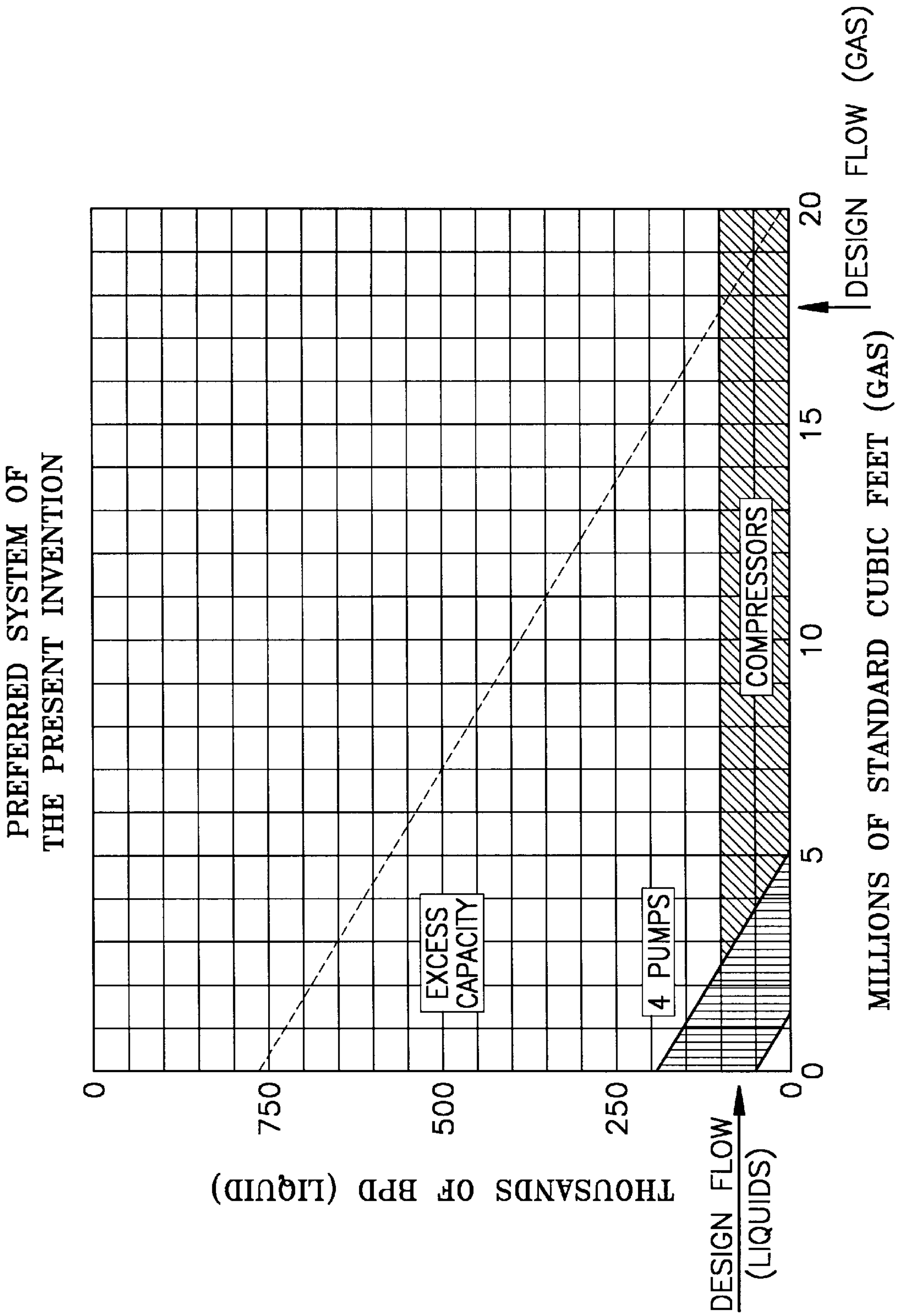
FIG. 9 is a graph of the performance of a preferred embodiment of a system of the present invention during a test peak flow period.
Figure 10:
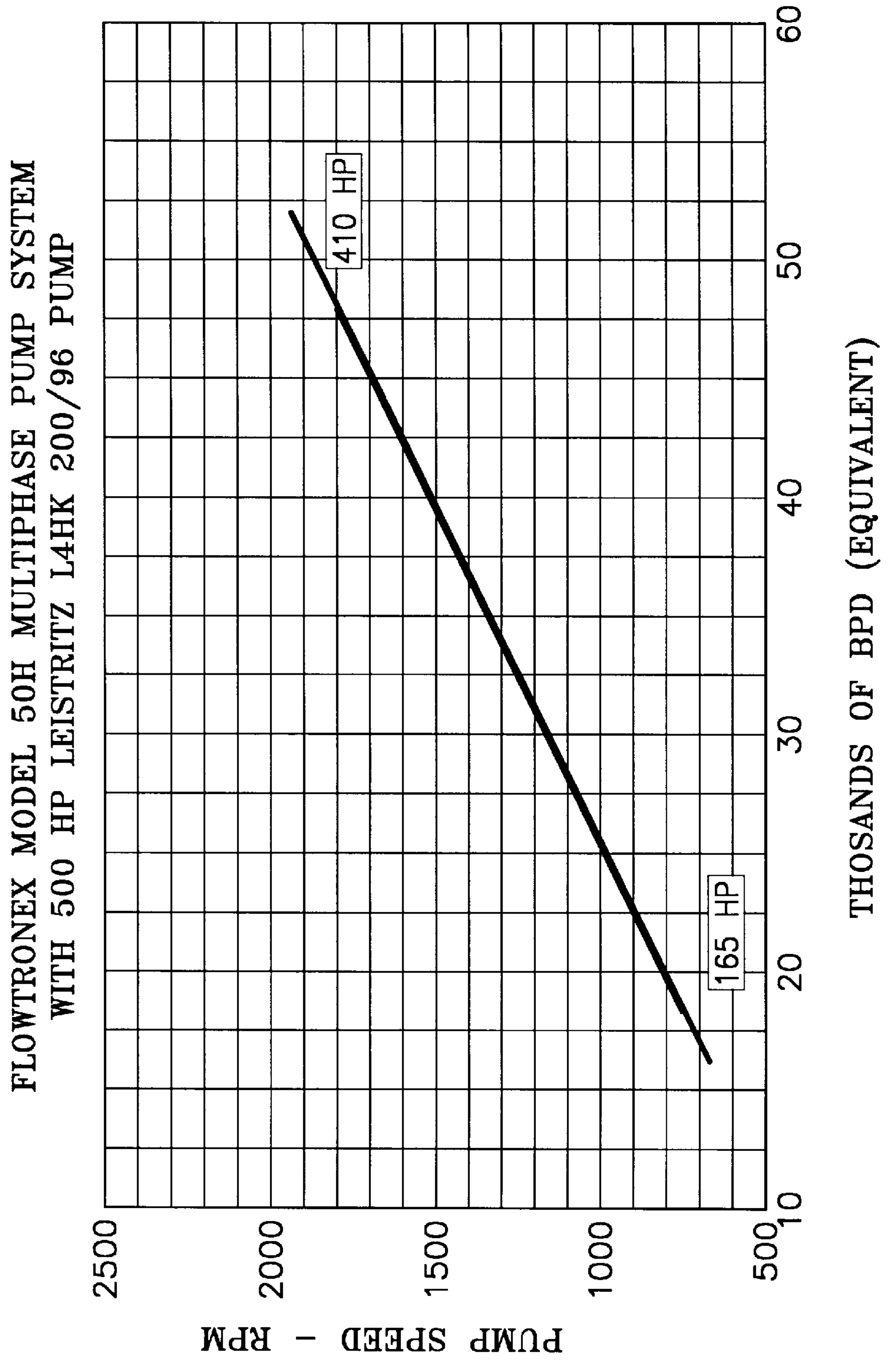
FIG. 10 is a graph of the performance curve of the type of pump utilized in the tests depicted in FIGS. 8 and 9.

A test station simulated the performances of a known system and a preferred system of the present invention during a peak flow period. The data from the study is shown in FIGS. 8 through 10. The known system utilized Model 50 multiphase pumps. In this known system, the number of pumps grew to meet the flow demand until they maxed out at 16 units and 8,000 horsepower. A parallel study using a preferred system of the present invention was also conducted. The preferred system of the present invention met the flow demand with only four pumps and four compressors, and it required only 4,000 horsepower. With reference to the figures, the growth in capacity of the preferred system of the present invention is essentially along the gas axis with little up the liquid axis. Consequently, the preferred system of the present invention eliminated the need to pump liquids at the total rate of the mixture and the need for a relatively large pumping station. Based on this data, each of the systems cost about $1,000 per horsepower. Therefore, the preferred system of the present invention may result in equipment cost savings of about $4,000,000 compared to the known system. Additional savings may result from less power and equipment operating costs.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A method for transferring a multiphase flow to a predetermined location in a pipe, said multiphase flow comprised of at least a liquid phase and a gas phase, said method comprising:

providing said multiphase flow to a flow divider, said flow divider comprising at least one vessel, said at least one vessel comprising at least one inner tube adapted to facilitate flow therein, said at least one inner tube adapted to receive said multiphase flow, and release a gas portion of said multiphase flow, and to release a remainder of said multiphase flow;

diverting said gas portion from said multiphase flow in said flow divider;

passing said remainder of said multiphase flow through a pump;

passing said gas portion through a compressor;

recombining said gas portion with said remainder of said multiphase flow; and transferring said multiphase flow to said predetermined location through said pipe.

2. The method of claim 1 wherein said multiphase flow is comprised of about 95% natural gas and about 5% oil by volume.

3. The method of claim 1 wherein diversion of said gas portion from said multiphase flow includes applying centrifugal force to said multiphase flow to separate said gas portion from said multiphase flow.

4. The method of claim 1 further comprising:

removing liquid droplets from said gas portion that was diverted from said multiphase flow; and returning said liquid droplets to said remainder of said multiphase flow prior to passing said remainder of said multiphase flow through said pump.

5. The method of claim 1 further comprising:

monitoring the liquid level in said flow divider; and adjusting the pump speed to substantially maintain a desired liquid level range in said flow divider.

6. The method of claim 1 further comprising:

diverting a portion of said gas portion from said compressor;

wherein a remaining portion of said gas portion is passed through said compressor.

7. The method of claim 1 further comprising:

diverting a portion of said gas portion that has been passed through said compressor;

wherein a remaining portion of said gas portion is recombined with said remainder of said multiphase flow.

8. A method for handling a multiphase flow, said multiphase flow comprised of at least a liquid phase and a gas phase, said method comprising:

providing said multiphase flow to a flow divider, said flow divider comprising at least one vessel, said at least one vessel comprising at least one inner tube adapted to facilitate flow therein, said at least one inner tube adapted to receive said multiphase flow, to create a flow separation and release a gas portion of said multiphase flow, and to release a remainder of said multiphase flow;

diverting said gas portion from said multiphase flow;

passing said remainder of said multiphase flow through a pump; and transferring said remainder of said multiphase flow to a predetermined location through a pipe.

9. The method of claim 8 wherein diversion of said gas portion from said multiphase flow includes applying centrifugal force to said multiphase flow to separate said gas portion from said multiphase flow.

10. The method of claim 8 further comprising:

removing liquid droplets from said gas portion that was diverted from said multiphase flow; and returning said liquid droplets to said remainder of said multiphase flow prior to passing said remainder of said multiphase flow through said pump.

11. The method of claim 8 further comprising:

monitoring the liquid level in said flow divider; and adjusting the pump speed to substantially maintain a desired liquid level range in said flow divider.

12. A system for transferring a multiphase flow to a predetermined location in a pipe, without the need to measure the gas-to-liquid ratio of said multiphase flow before said multiphase flow enters said system, said multiphase flow comprised of at least a liquid phase and a gas phase, said system comprising:

a flow divider in fluid communication with a source of said multiphase flow, said flow divider adapted to separate a gas portion from a remainder of said multiphase flow, said flow divider comprising at least one vessel, said at least one vessel adapted to receive said multiphase flow and release said gas portion of said multiphase flow, and to release said remainder of said multiphase flow;

a pump in fluid communication with said flow divider, said pump adapted to pump said remainder to form a pumped portion;

a compressor in fluid communication with said flow divider, said compressor adapted to compress said gas portion to form a compressed portion;

a recombining device adapted to recombine said pumped portion with said compressed portion to form a recombined portion; and a pipe in fluid communication with said recombining device, said pipe adapted to receive said recombined portion and to transfer said recombined portion to said predetermined location.

13. The system of claim 12 further comprising a gas scrubber interposed between said flow divider and said compressor, said gas scrubber adapted to remove liquid droplets from said gas portion and to return said liquid droplets to said remainder of said multiphase flow.

14. The system of claim 12 further comprising a liquid level measurement device adapted to monitor the liquid level in said flow divider.

15. The system of claim 14 wherein said liquid level measurement device is a differential pressure indicator.

16. The system of claim 14 further comprising a programmable logic controller in electrical communication with said liquid level measurement device and said pump, said programmable logic controller adapted to adjust the pump speed based on the liquid level in said flow divider.

17. The system of claim 12 wherein the velocity of said multiphase flow entering at least one side opening of said flow divider creates centrifugal forces that initially force a liquid portion of said remainder against the sides of said flow divider while said gas portion remains substantially in the center of said flow divider.

18. The system of claim 12 further comprising an expansion vessel in fluid communication with said flow divider such that said expansion vessel receives an excess portion of said remainder when said remainder reaches a predetermined level in said vessel of said flow divider.

19. The system of claim 12 further comprising a liquid trapping vessel interposed between said pump and said recombining device, said liquid trapping vessel adapted to send a portion of said remainder back to said pump to maintain a sufficient seal.

20. The system of claim 12 wherein said recombining device is a recombination manifold comprised of a wye section and an eduction tube.

* * * * *